(12) United States Patent
Koehn et al.

(10) Patent No.: US 8,590,283 B2
(45) Date of Patent: Nov. 26, 2013

(54) DOWNED CORN RAKE

(76) Inventors: LeRoy Koehn, Othello, WA (US); Eugene Unruh, Copeland, KS (US)

(*) Notice: Subject to any disclaimer, the term of this patent is extended or adjusted under 35 U.S.C. 154(b) by 0 days.

(21) Appl. No.: 13/355,001

(22) Filed: Jan. 20, 2012

(65) Prior Publication Data

US 2013/0186052 A1    Jul. 25, 2013

(51) Int. Cl.
*A01D 45/02*      (2006.01)
(52) U.S. Cl.
USPC ............................................................. 56/119
(58) Field of Classification Search
USPC .................................. 56/119, 313, 312, 314
See application file for complete search history.

(56) References Cited

U.S. PATENT DOCUMENTS

| | | | | |
|---|---|---|---|---|
| 2,187,438 A * | 1/1940 | Wilcox | ............................ | 56/313 |
| 2,576,122 A * | 11/1951 | Kenison | ........................... | 56/312 |
| 2,577,324 A * | 12/1951 | Goesch | ............................ | 56/312 |
| 2,734,332 A * | 2/1956 | Fisher | ............................. | 56/312 |
| 2,892,298 A * | 6/1959 | Chaney | ........................... | 56/314 |
| 2,960,814 A * | 11/1960 | Babcock | .......................... | 56/312 |
| 3,163,975 A * | 1/1965 | Lightsey | .......................... | 56/313 |
| 3,408,797 A * | 11/1968 | Currence | ....................... | 56/13.5 |
| 3,408,800 A * | 11/1968 | Jezek, Jr. | .......................... | 56/34 |
| 3,418,791 A * | 12/1968 | Starkey | ............................. | 56/42 |
| 3,438,184 A * | 4/1969 | Jellis, Jr. | ......................... | 56/119 |
| 3,788,051 A * | 1/1974 | Richardson | ..................... | 56/318 |
| 3,834,139 A * | 9/1974 | Schumacher et al. | ........... | 56/313 |
| 4,087,954 A * | 5/1978 | Reese, Sr. | ........................ | 56/119 |
| 4,550,555 A * | 11/1985 | Rohlik | ............................. | 56/314 |
| 5,493,850 A * | 2/1996 | Torkelson | ............................ | 56/8 |
| 5,588,494 A * | 12/1996 | Pickett et al. | .................. | 171/124 |
| 6,530,202 B1 * | 3/2003 | Guyer | ............................... | 56/220 |
| 6,691,499 B2 * | 2/2004 | Schumacher et al. | .......... | 56/312 |
| 6,708,475 B2 * | 3/2004 | Guyer | ............................... | 56/220 |
| 7,650,738 B2 * | 1/2010 | Dietrich | ........................... | 56/314 |
| 8,286,410 B2 * | 10/2012 | Priepke et al. | ................... | 56/119 |
| 2001/0003237 A1 * | 6/2001 | Wolters et al. | .................... | 56/64 |

* cited by examiner

*Primary Examiner* — Árpád Fábián-Kovács
(74) *Attorney, Agent, or Firm* — Wells St. John P.S.

(57) ABSTRACT

A rake for harvesting downed corn, including a mounting plate, a camshaft comprising a series of cams, and a plurality of support bars extending between the mounting plate and the camshaft. Rake tines are attached to each of the cams. A rotating rake implement mounted on a header with pairs of rake tines mounted on a camshaft and kickback arms attached to each pair of tines. A hydraulic motor is configured to drive the camshaft.

9 Claims, 15 Drawing Sheets

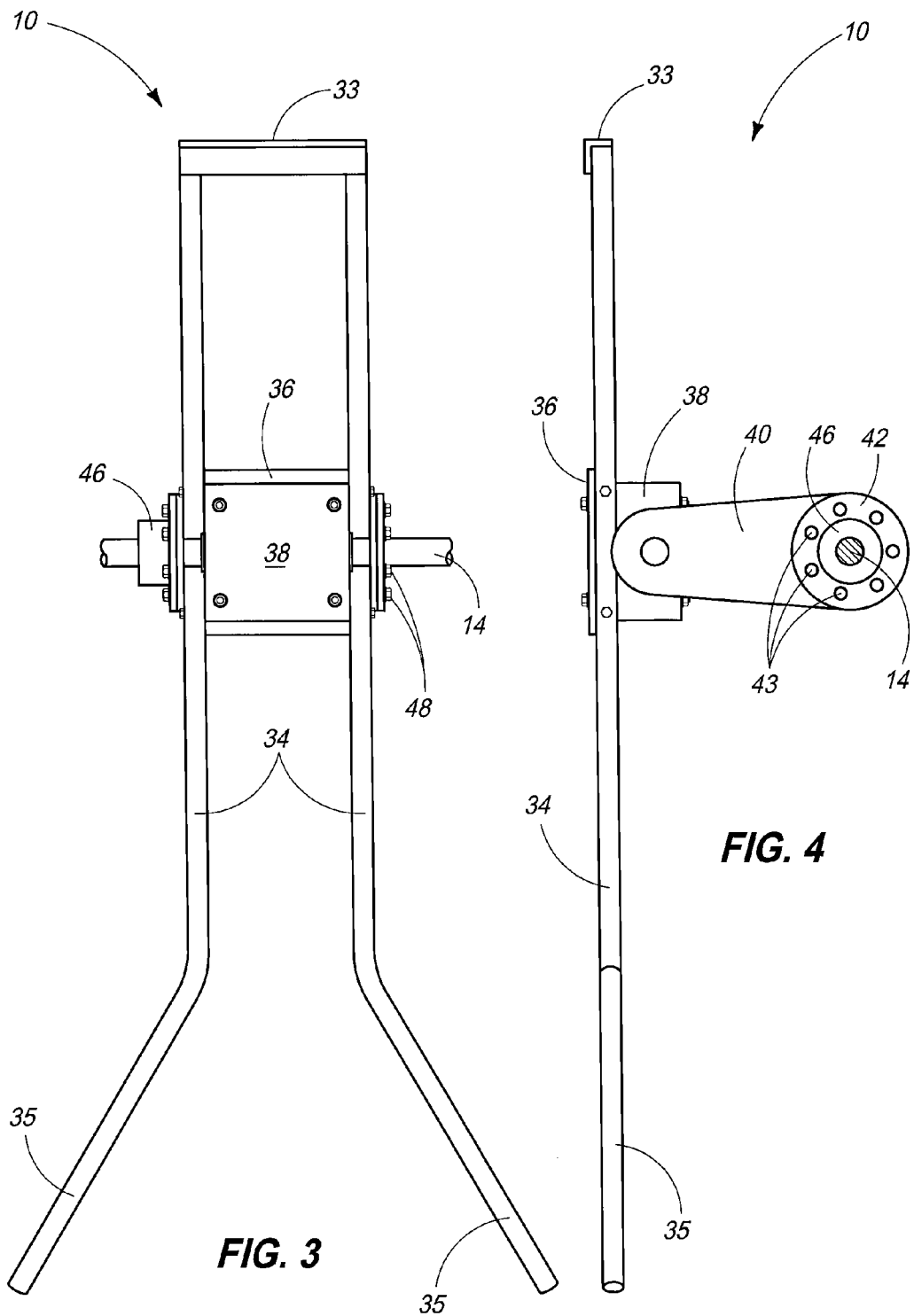

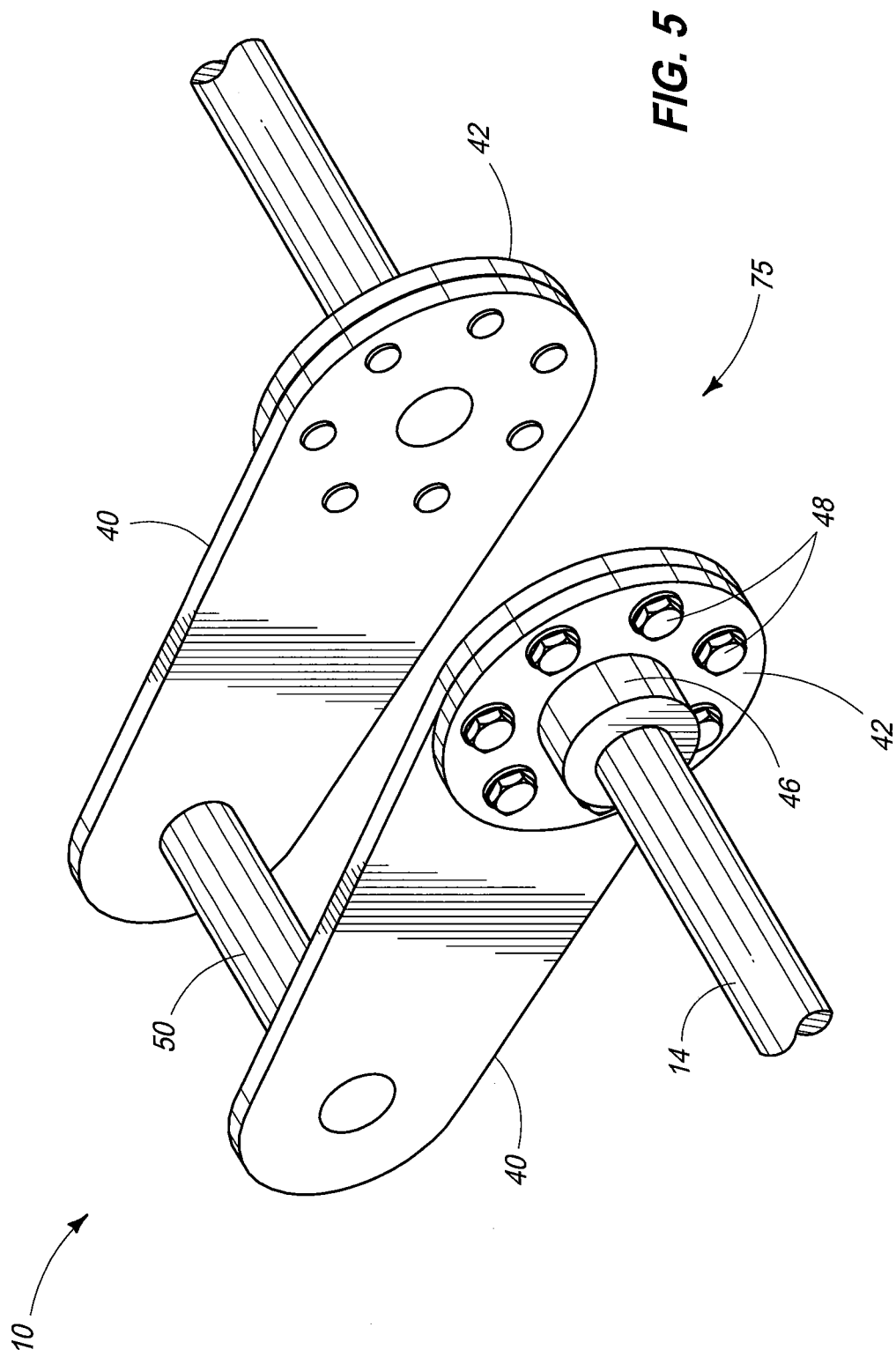

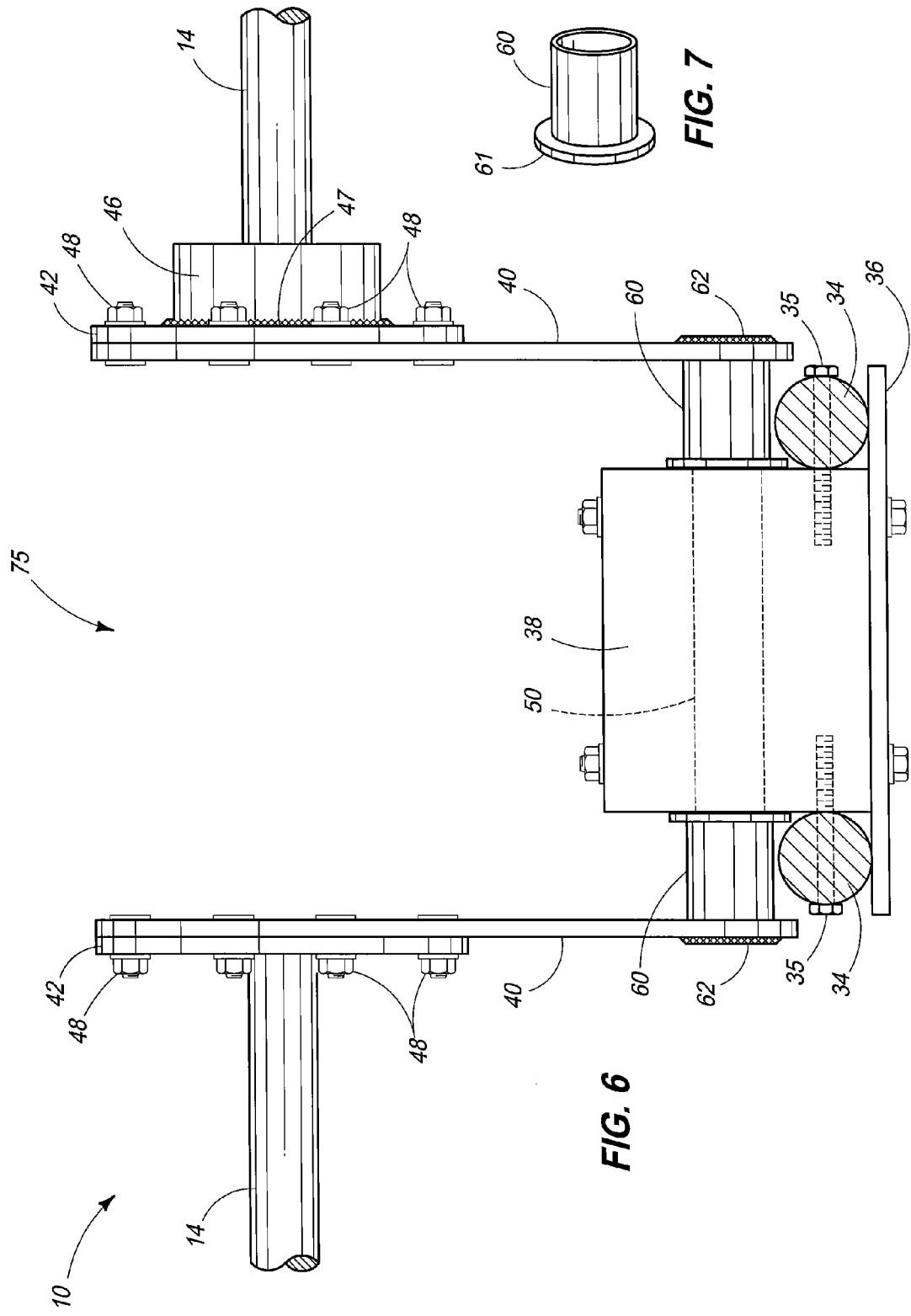

DOWNED CORN RAKE

TECHNICAL FIELD

The invention pertains to corn rakes and methods of harvesting downed corn.

BACKGROUND OF THE INVENTION

Corn is typically harvested utilizing combine harvesters equipped with specialized corn harvesting heads or headers. The headers can be designed to allow the harvester to harvest a particular number of rows of corn per pass. The corn is fed between tips and snouts of the head into an auger section of the head, the stalk being separated from the ear.

During some harvest years, some of the corn plants can become bent over or downed due to wind and or rain. Harvester heads are not designed or equipped to harvest downed corn. The downed corn can be missed by the harvester or can become trapped in the head, clogging the head. Current attachments designed to pick up downed corn can be ineffective, especially under conditions where a large percentage of the crop is down. It would be desirable to develop systems and methods for harvesting downed corn.

SUMMARY OF THE INVENTION

The invention encompasses a rake for harvesting downed corn, including a mounting plate, a camshaft comprising a series of cams, and a plurality of support bars extending between the mounting plate and the camshaft. Rake tines are attached to each of the cams. The invention encompasses a rotating rake implement for mounting on a corn head of a harvester. The implement includes pairs of rake tines mounted to cams on a camshaft and spring-loaded arms attached to each pair of tines that extend to posts attached to a mounting channel with a flexible attachment between the arms and the posts being. A hydraulic motor is configured to drive the camshaft.

The invention further encompasses a method of harvesting downed corn. A combine harvester equipped with a corn head is provided having a corn rake mounted to the head. The corn rake includes pairs of rake tines mounted on a camshaft. With the camshaft rotating, the combine harvester is driven through the downed corn, the pairs of rake tines assisting in providing the downed corn to an auger area of the corn head.

BRIEF DESCRIPTION OF THE DRAWINGS

Preferred embodiments of the invention are described below with reference to the following accompanying drawings.

FIG. 3 is a front view of a pair of rack tines in accordance with one aspect of the invention.

FIG. 4 is a side view of the pair of rake tines depicted in FIG. 3.

FIG. 5 illustrated a cam comprised by a camshaft in accordance with one aspect of the invention.

FIG. 6 illustrates a fragmentary view of a camshaft showing a cam with a mounted pair of rake tines in accordance with one aspect of the invention.

FIG. 7 depicts a mounting sleeve in accordance with one aspect of the invention.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

The invention generally includes rake implements for mounting on corn headers of combine harvesters. The rakes of the invention are capable of efficiently picking up downed cord without interfering with standing corn. The rakes supply the downed corn into the auger section of the header allowing the downed corn to be processed along with the standing corn. The invention further encompasses methods of harvesting downed corn utilizing the rakes encompassed by the invention.

The rake implements and methodology of the invention are described generally with reference to FIGS. 1-17. It is to be understood that the illustrated drawings may not be drawn to scale with respect to all aspects.

Figure 1:
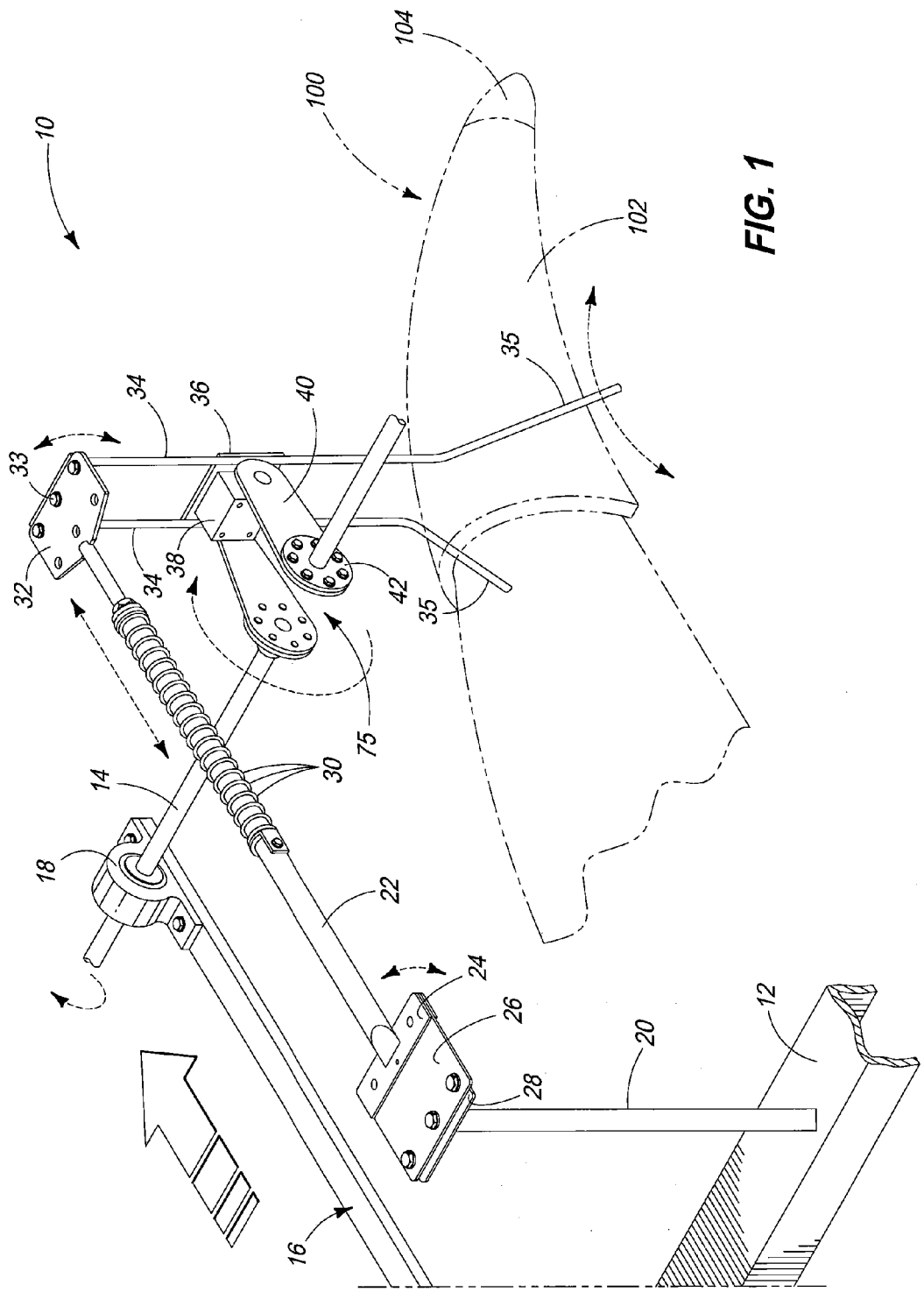
FIG. 1 is a fragmentary view of a portion of an example cord rake encompassed by the invention shown mounted with respect to a fragmentary view of a corn header of a harvester.

Referring initially to FIG. 1, such depicts a portion of a corn rake implement 10 in accordance with the invention. The direction of travel during harvest is indicated by the broad arrow at the upper left of the figure. Rake 10 has a mounting channel 12 which is configured to mount over a back structure (not shown) of a cord header. Positioning of rake 10 with respect to the header is illustrated by showing a snout 102 and tip 104 of a corn header 100. Corn header 100 is shown in phantom view to indicate that such is not part of the invention.

The corn rakes of the invention are configured generally for use upon any make of corn header. As described below, the repeating parts can be adjusted in number to fit smaller corn headers (such as four row headers) or to adapt to very large headers.

Rake 10 shown in FIG. 1 can typically comprise a rotating shaft 14 such as a camshaft. The camshaft is supported by a plurality of support bars 16 which extend from the mounting channel to the camshaft. Each support bar can be equipped with a bearing, such as a sealed pillow block bearing through which the camshaft passes.

The camshaft includes a plurality of cams 75. Upon each cam is mounted a pair of rake tines 34/35 which rotate with the turning of the camshaft. As depicted, the cams comprise two cam arms 40 each with a circular coupler 42 associated with the camshaft end of the arm. The opposing end of the cam arms supports a rod which passes through a bearing 38. Bearing 38 can be, for example, a wood bearing or a UHMW bearing with a through-hole to accommodate the cam rod (not shown). The cam bearing can be mounted to a backing plate which is in turn mounted to the pair of tines at an upper portion of the tines 34 where the pair of tines is parallel relative to one another. A lower portion of the pair of tines 35 can angle away from one another. The angle can range from about 30° to 40°, with a preferred angle being 35°. This angled configuration allows efficient lifting of downed corn and transport to the auger section of the header.

A plurality of upright supports 20 is mounted on the mounting channel and is attached to and support kickback arms 20. The upright supports can be disposed approximately one inch from the back of the mounting channel, although alternative positioning is possible. The kickback arms attach to the upright supports at a first end and attach to a cross-member 33 disposed between the uppermost portions of the parallel segments of the tine pairs at a second end. The first end of the kickback arms are equipped with a flexible hinge which can comprise belting with fiber to allow up and down motion of the arms with the turning of the camshaft. The first end is connected by the belt to a metal plate 28 that is disposed at the top of the upright supports. The belt is also connected to the first end of the kickback arm.

A metal plate 32 is disposed at the second end of the kickback arm and the metal plate bolts to the cross-member 33 between the pair of tines. A tension spring such as a potato planter pressure spring 30 is provided over the kickback arm proximate the second end. Tension spring 30 functions to act as a shock absorber whenever the tines experience an overload. This feature protects the tines at a stress limit, momentarily relieving stress on the tines.

Figure 2:
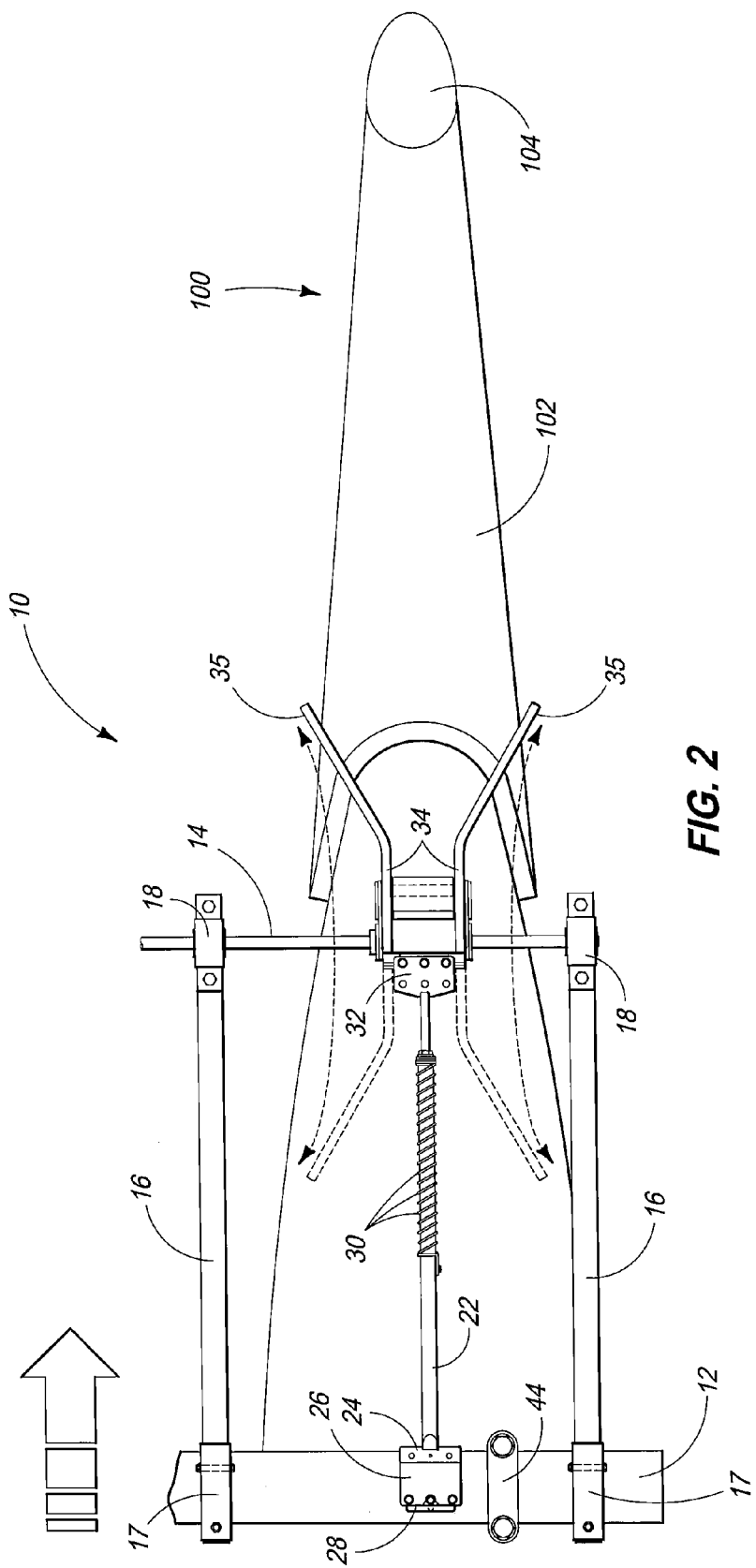
FIG. 2 is a top, fragmentary view of the corn rake depicted in FIG. 1 showing the range of motion of rake tines.

Referring next to FIG. 2, the direction of harvester travel is indicated by the broad arrow in the lower left of the figure. The Figure shows the positioning of the rake tines 34/35 with respect to the snout 102 of header 100. The figure also indicates the range of motion of the angled portion 35 of the tines utilizing dashed lined and arrows. The positioning of two support bars 16 relative to the cam.

Support bars 16 can preferably made of square tubing which can insert into a holder 17 mounted on the mounting channel 12. Holders 17 can be of a square tubing that is large enough for the support bars to slide within. The length of the overall arms can be adjusted by providing alternative connection holes in the support bar to bolt together with the respective holder. This adjustment determines the relative position of the camshaft with respect to the features of the combine header and can be used to maximize the efficiency of harvesting the downed corn.

As shown in FIG. 2, the channel mount is held in place in a mounted position on the back of the header utilizing keepers 44. The keepers span the width of the channel mount and have overhang on either end to provide a bolt through and into a second keeper beneath the channel mount. The bolts can be tightened with nuts to hold the mounting channel in place on the header.

An example pair of rake tines in accordance with the invention is illustrated in FIG. 3. Recall that the each tine includes a parallel segment 34 relative to the other tine of the pair, and a lower angled segment 35. Example lengths of the segments are about 32.5 inches for the parallel segments measured from the upper crosspiece 33 to the bend in the tine. The lower angled segments can be about 11.5 inches. The angle between lower sections 35 is not limited to a particular value and can be from about 30 degrees to about 40 degrees. A preferred angle value can be about 35 degrees which can maximize corn pickup. An example distance between inside edges of the parallel segments of tines can be about 5.25 inches. The backing plate 36 can be about 5 inches in height and wide enough to mount to each of the pair of tines.

The cam bearing 38 can be about 5 inches by 4 inches with a 2.5 inch thickness. A one inch diameter hole passes through the 5 inch depth of the bearing for locking the bearing around the cam rod.

A one-inch shaft collar is utilized to lock the cam onto the camshaft. This collar may be made by halving a two-inch collar.

Referring to FIG. 4, such is a side view of the pair of tines shown in FIG. 3. Such depicts the elongate cam arm 40 and the circular coupler, each having seven holes 43 for bolting up the arm to the camshaft 14. The position of the arm and the seven holes in the bolt-up position with the shaft collar determines the position of rotation or timing relative to all other pairs of rake tines along the camshaft.

Next, with respect to FIG. 5, such shows the cam 75 without the attached rake tines. In this view, the cam rod 50 can be seen. The cam rod passes through the hole in the cam bearing. Before addition of the collar, the cam can freely rotate about the camshaft 14. Addition and bolt-up of the collar locks the cam into the correct timing position relative to the additional cams on the camshaft.

FIG. 6 illustrates the presence of the cam bearing 38 on the cam rod 50. A sleeve 60 (shown in FIG. 7) is positioned on the cam rod on each side of the bearing to position the bearing. The sleeve has a widened ring at one end that interfaces the bearing. There is no weld between the sleeve and the inner face of the cam arm. An outer weld 62 maintains the position of the cam rod with respect to the cam arm.

Figure 8:
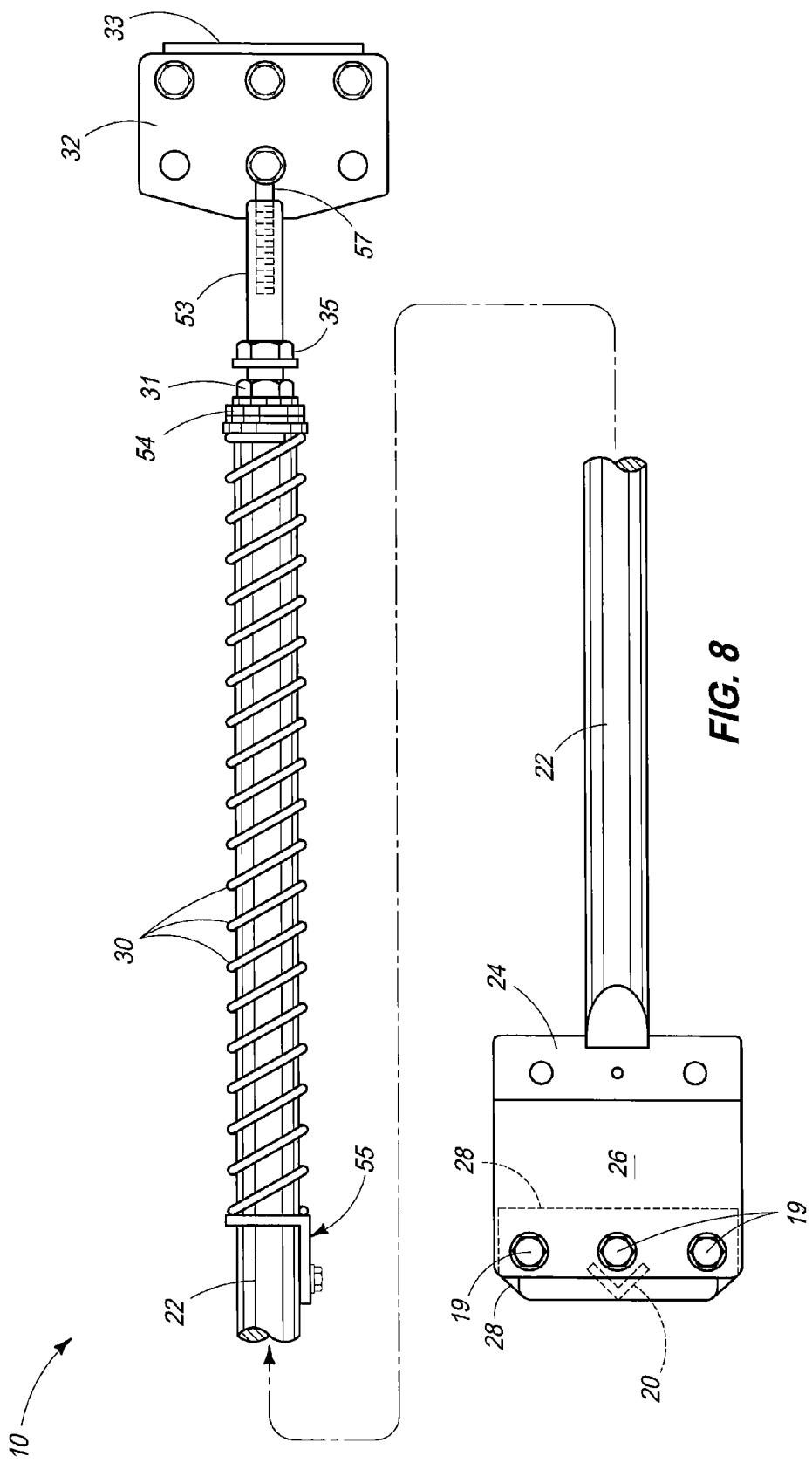
FIG. 8 illustrates a fragmented torsion arm in accordance with one aspect of the invention.

FIG. 8 is a fragmented depiction showing the details of the kickback arm 22. In phantom view are the metal support 20 and the metal support plate 28 atop the support which supports the kickback arm. The metal support plate can be about 6 inches wide. The fiber belt hinge 26 is shown connected between the metal support plate and a metal attachment 24 at the first end of the kickback arm 22. The belt can be about six inches wide and about four inches long. The first end of the kickback arm attaches the second end of the kickback arm utilizing a ¾ inch pipe coupler locked with a 3.16 inch roll pin.

The second end of the kickback arm carries the tension spring 30 which is held in place at a desired tension by a bolted on, adjustable lock ring 55 on the backside of the spring which encircles the arm and bolts to the arm, and a nut 31 welded to a washer 54 facing the spring with a second backup nut 35 utilized for a jammer. These nuts are threaded onto a short 9 inch long, ¾ inch diameter threaded rod which threads into the main rod 22 of the kickback arm. A smaller diameter rod 57 is present at the tip of the second end of the kickback arm. This smaller rod attaches to a front metal plate 32 which bolts to the cross-member between the tines comprised by a pair of tines.

Figure 9:
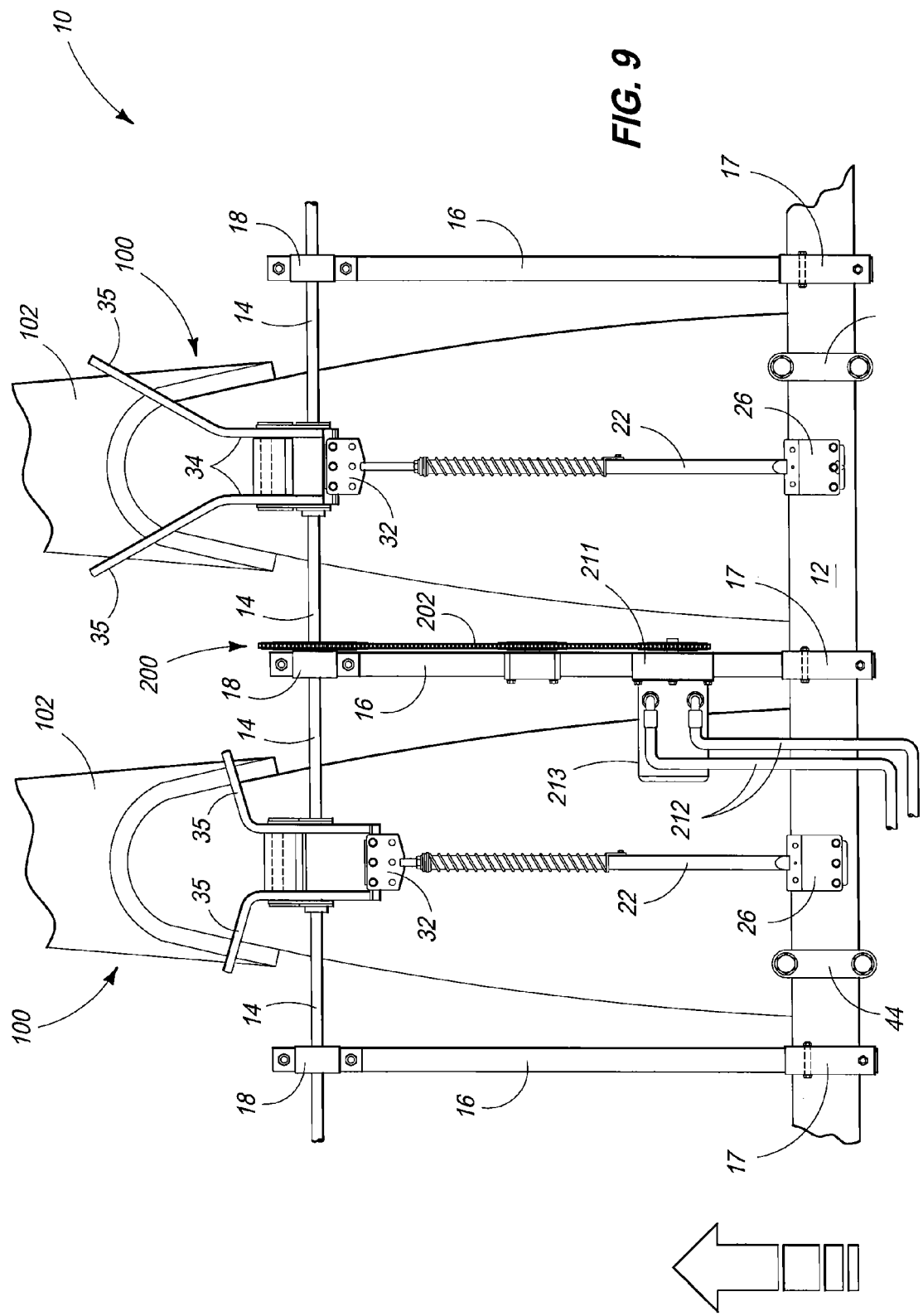
FIG. 9 illustrates a fragmentary top view of a portion of a mounted corn rake on a fragmentary corn header.

Referring next to FIG. 9, such depicts a pair of kickback arms 22 and their position relative to snouts 102 of the header. Such also shows example relative timing of neighboring pairs of tines, with the pair on the right being in a fully forward position while the pair on the left is in a more retracted position.

Three support bars 16 are illustrated showing their positioning relative to the kickback arms. The support bars are adjustable by providing alternative bolt up holes (not shown) for sliding bar 16 within keeper 17 which is stationary on the mounting bar. Adjustment in length may be made by sliding bar 16 within keeper 17 and choosing an appropriate bolt-up hole. The length adjustment can effect the efficiency of harvest of downed corn and may need to be adjusted based upon the particular field depending upon factors such as the amount of downed corn, the direction and uniformity of the lay of the downed corn, etc.

As illustrated in FIG. 9, the rotation of cam shaft 14 can be accomplished utilizing a chain drive 200 driven by, for example, a hydraulic motor 213. A chain 202 can be provided mounted on appropriate sprockets (see below). Between two neighboring kickback arms. Where the number of kickback arms is even, chain drive 200 can preferably be positioned between the two central kickback arms in association with the central support bar 16. Hydraulic lines 212 can be connected to hydraulic motor 213 and can be part of the main hydraulic system of the harvester, controlled by a controller within the cab of the harvester (not shown).

The positioning of mounting clamps 44 (which mount the rake implement to the header) is also shown in FIG. 9, although the indicated positioning between a support bar 16 and a kickback arm is only one of many options.

Figure 10:
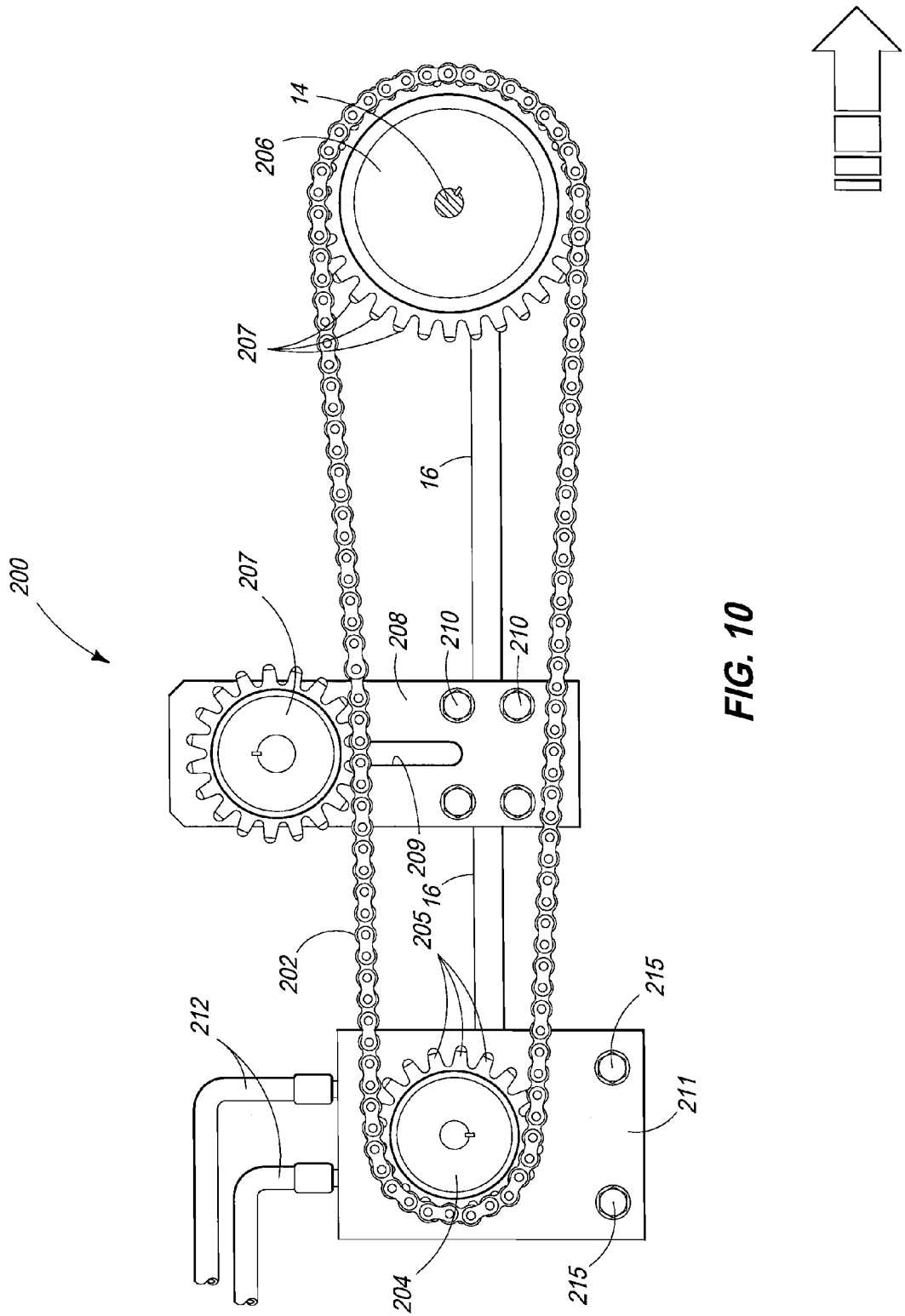
FIG. 10 shows a right side view of an example chain drive in accordance with one aspect of the invention.

FIG. 10 shows an isolated view of a chain drive system 200 in accordance with the invention, viewed from the right side of the harvester. Chain drive system 200 can include three sprockets 204, 206 and 207. The first sprocket 204 is associated with and driven by the hydraulic motor. A mounting plate 211 is shown which attaches to the motor and mounts the motor and drive sprocket 204 to the support bar 16 by a plurality of bolts 215.

A second sprocket 206 is mounted to camshaft 14 and works to turn the camshaft by a drive chain 202, which encircles both the first and second sprockets. Appropriate tension on chain 102 is set and maintained by providing a third sprocket 207 which is disposed on top of and engaged with chain 202. The vertical position of sprocket 207 is controlled by positioning sprocket 207 along a vertical opening 109 within a mounting plate 208. Mounting plate 208 is specific for positioning sprocket 207 along bar 16 between sprockets 204 and 206.

Figure 11:
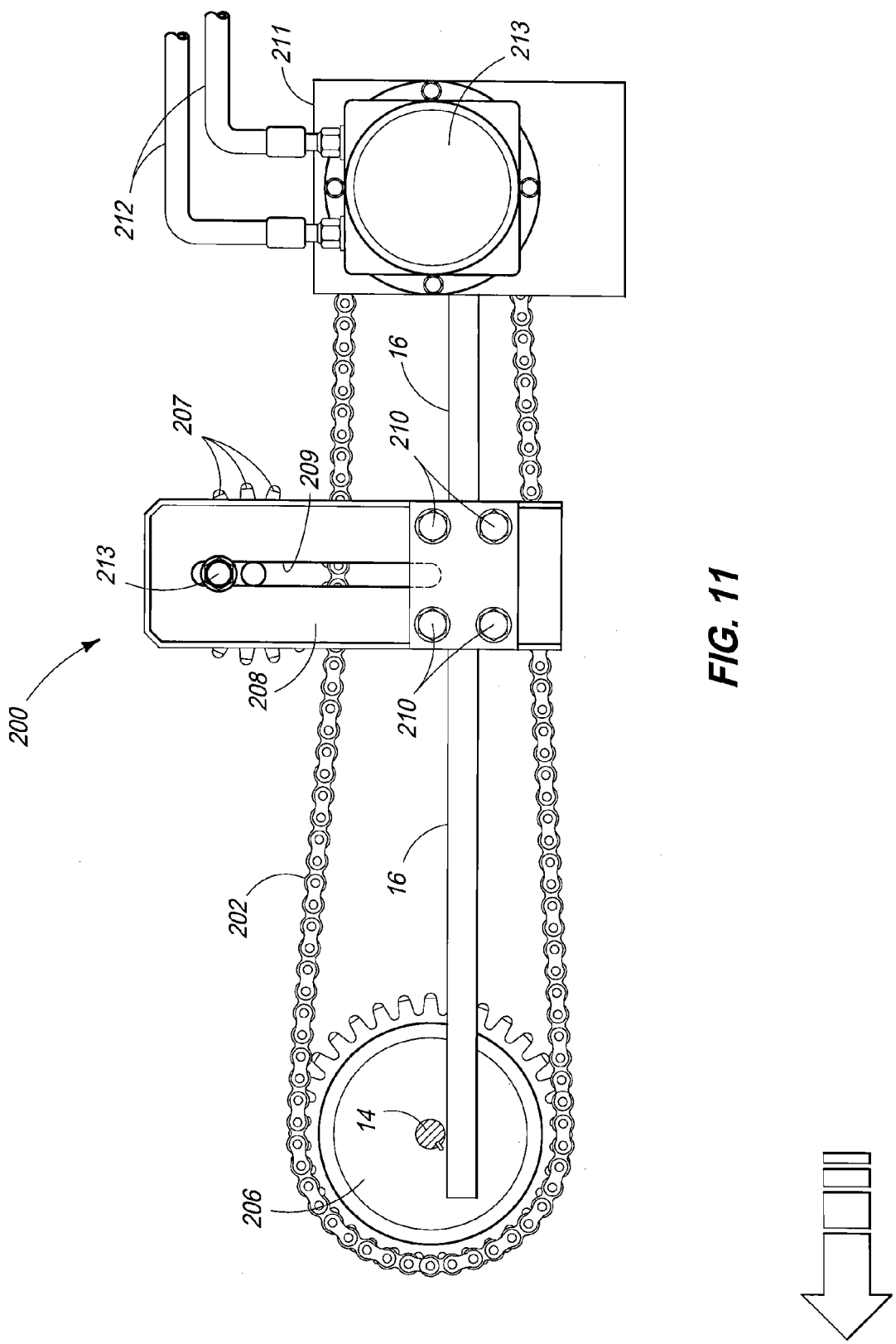
FIG. 11 is a left side view of the chain drive illustrated in FIG. 10.

As shown in FIG. 11, which is a view of chain drive 200 from the left, four bolts 210 may be utilized to position mounting plate 208 along support bar 16. (The pillow bearing has been omitted from FIG. 11 to allow the parts of the chain drive to be seen). A positioning bolt 213 fixes the position of sprocket 207 within vertical channel 209. FIG. 11 also depicts the example configuration of the hydraulic pump 213 as it is mounted to plate 211.

Referring again to FIG. 10, it is noted that sprocket 204 is smaller than sprocket 206. Example sizes for the sprockets when utilizing an example size #60 roller chain are 6032 (32 teeth) for sprocket 206, and 6019 (19 teeth) for smaller sprocket 204. These sizes are example sizes when utilizing a hydraulic pump to drive a 1 inch stress-proof camshaft.

Figure 12:
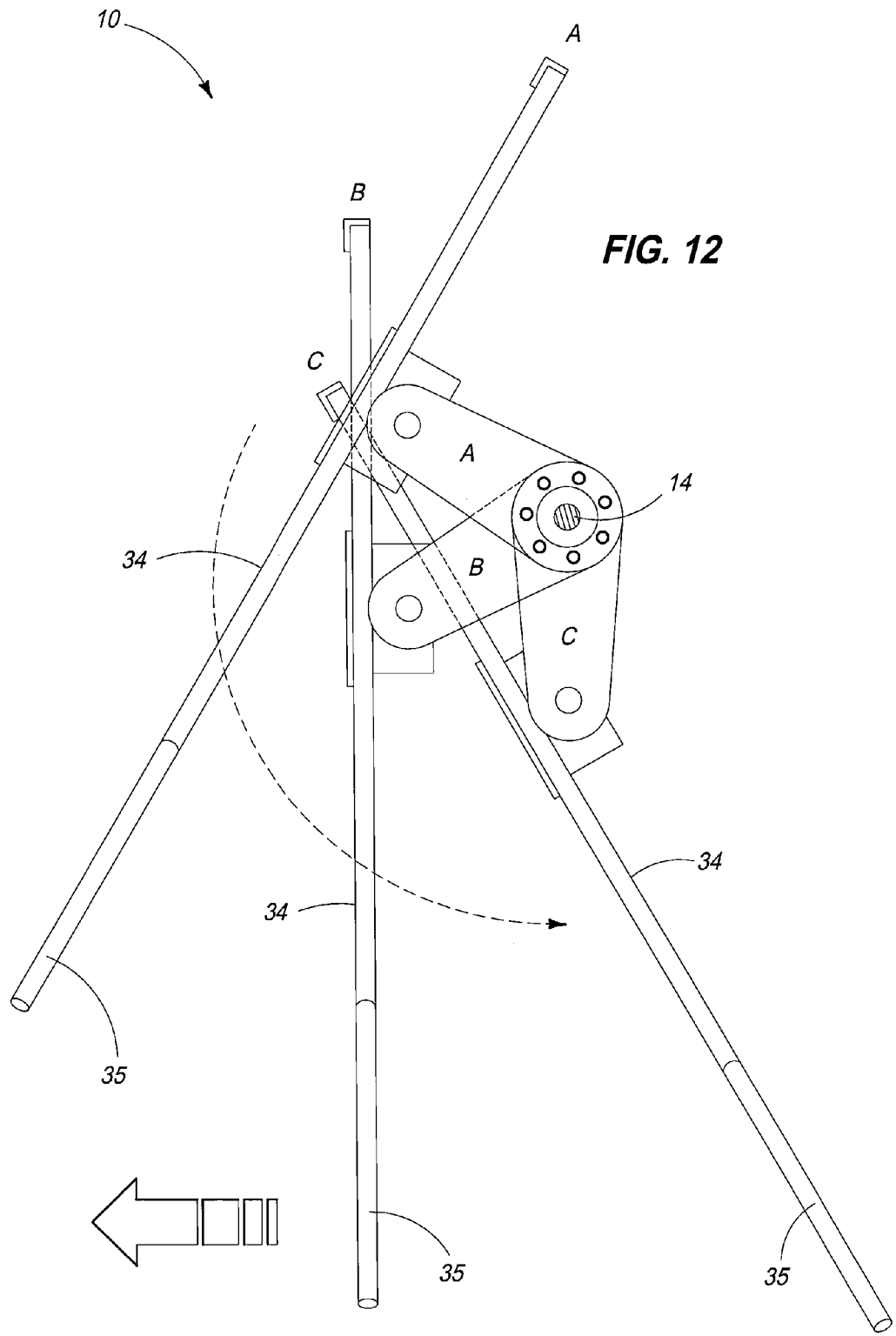
FIG. 12 is a diagrammatic view illustrating positioning of rake tines with the rotation of the camshaft in accordance with one aspect of the invention.
Figure 13:
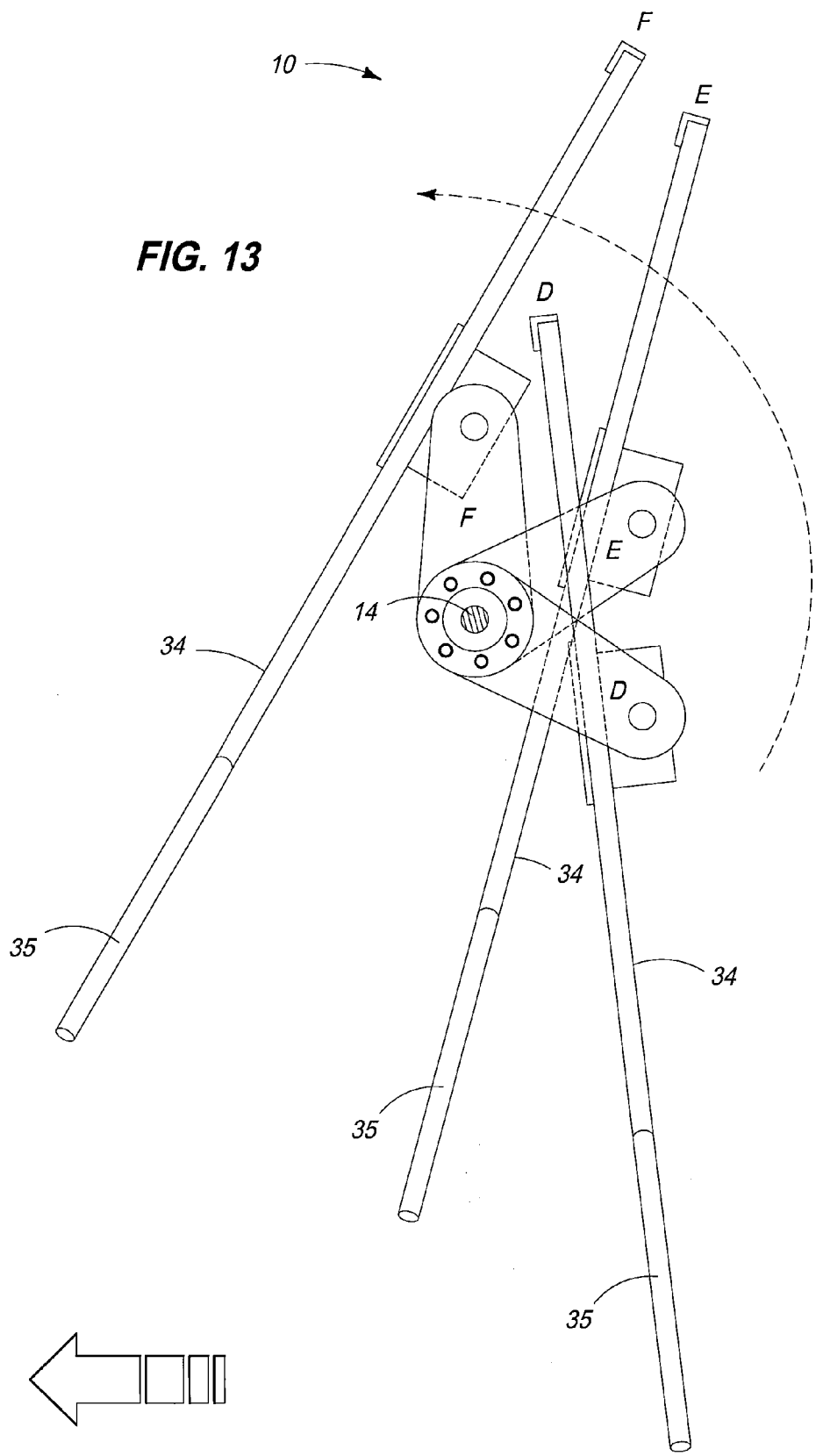
FIG. 13 is a view of the positioning of the rake tine with rotation of the camshaft subsequent to the positioning illustrated in FIG. 12.
Figure 14:
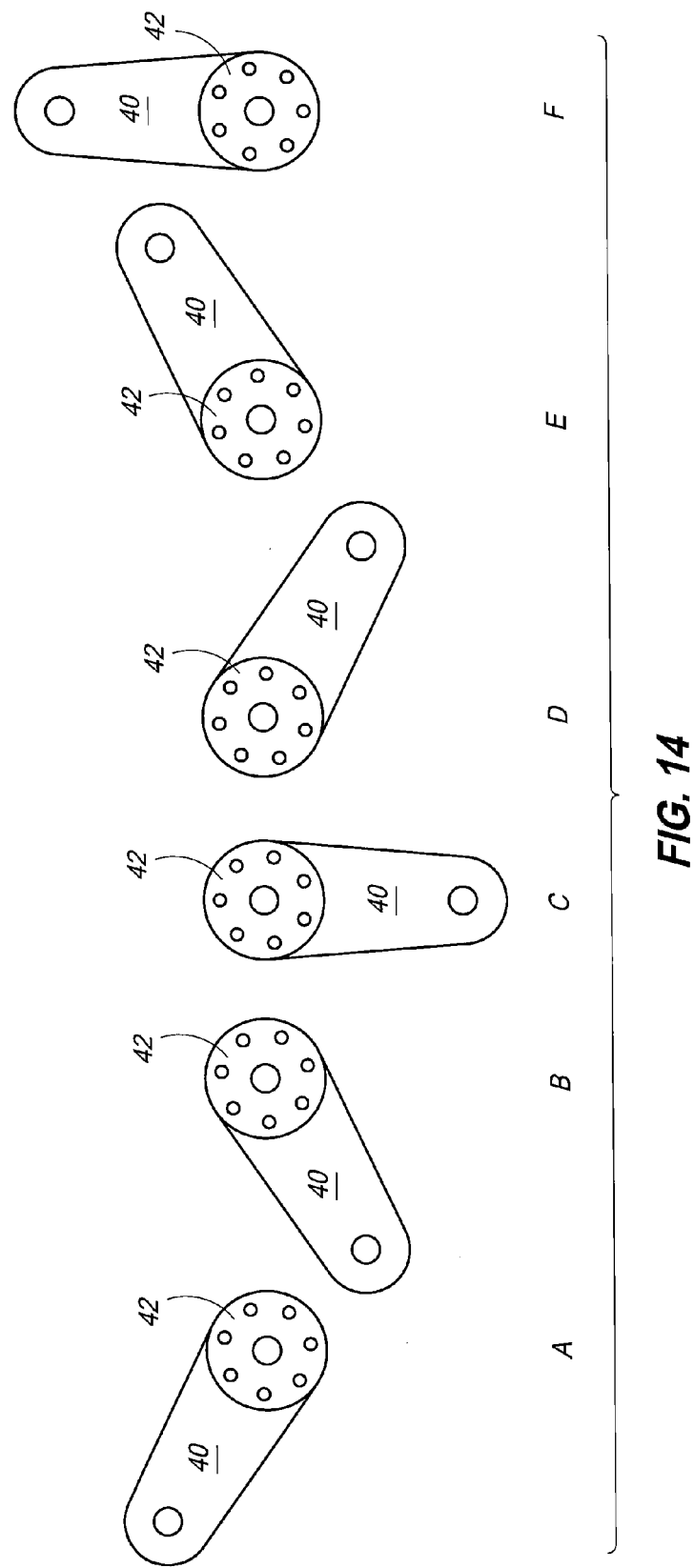
FIG. 14 illustrates the various positioning of the cam arms with rotation of the camshaft as depicted in FIGS. 12-13.

Referring next to FIGS. 12-13, the two figures depict the rotation of one pair of rake tines through one cycle of the cam. The pair of tines is depicted initially with the angled segments 35 in a forward most position (position A). The tines then drop down into a second position (position B) and proceed to rotate back toward the auger section of the header (not shown) in position C. This motion A-C contacts the downed corn with the tines and draws the corn back into the header. The positions D-F depicted in FIG. 13 shows how rotation around camshaft 14 returns the rake tines to a forward position (note position F must proceed to position A to fully extend the tines). FIG. 14 depicts the cam arm positions as the camshaft makes one rotation.

Figure 15:
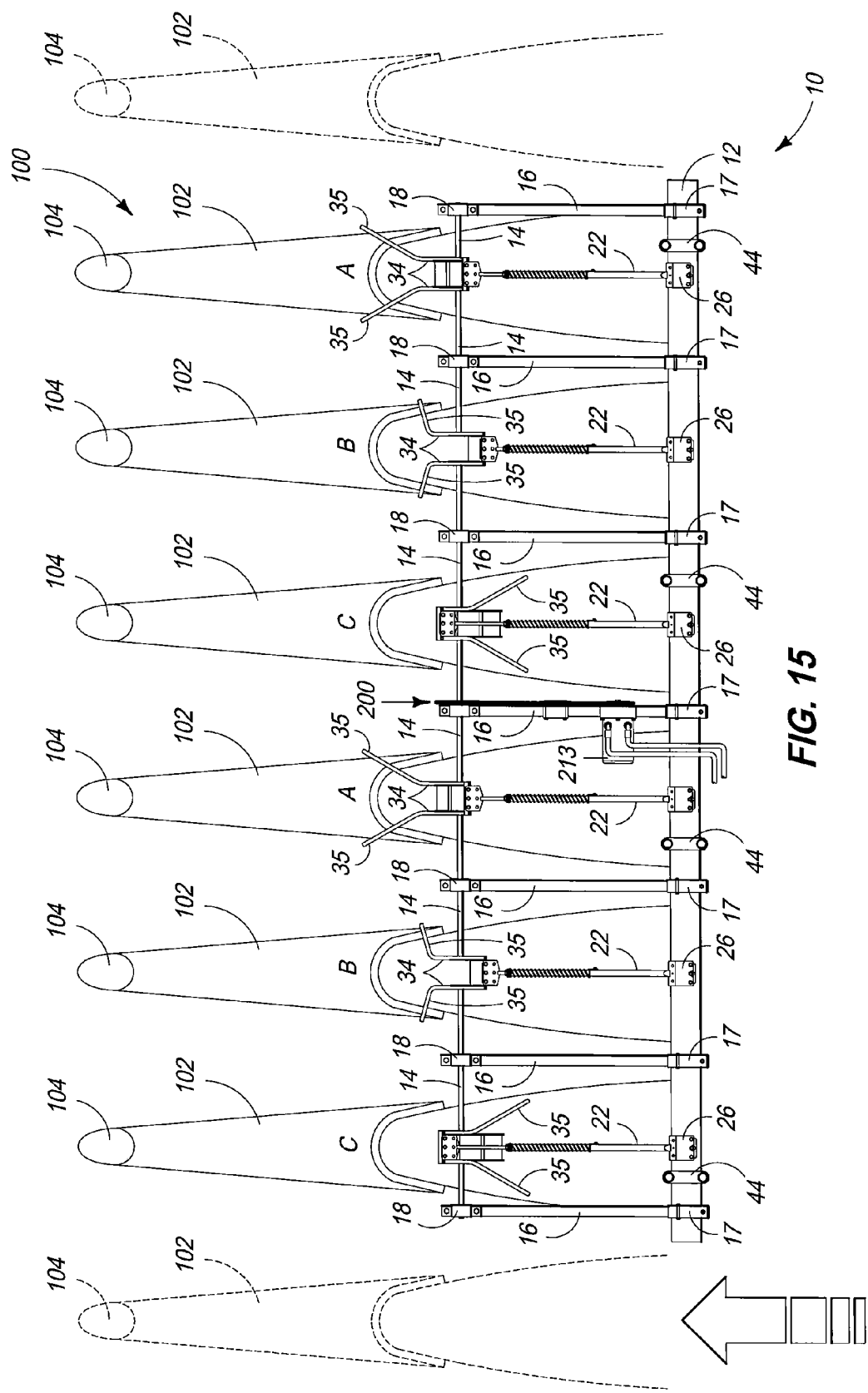
FIG. 15 is a top view illustrating an example rack configured for a six-row header with offset timing positioning of each of the pairs of rake tines.
Figure 16:
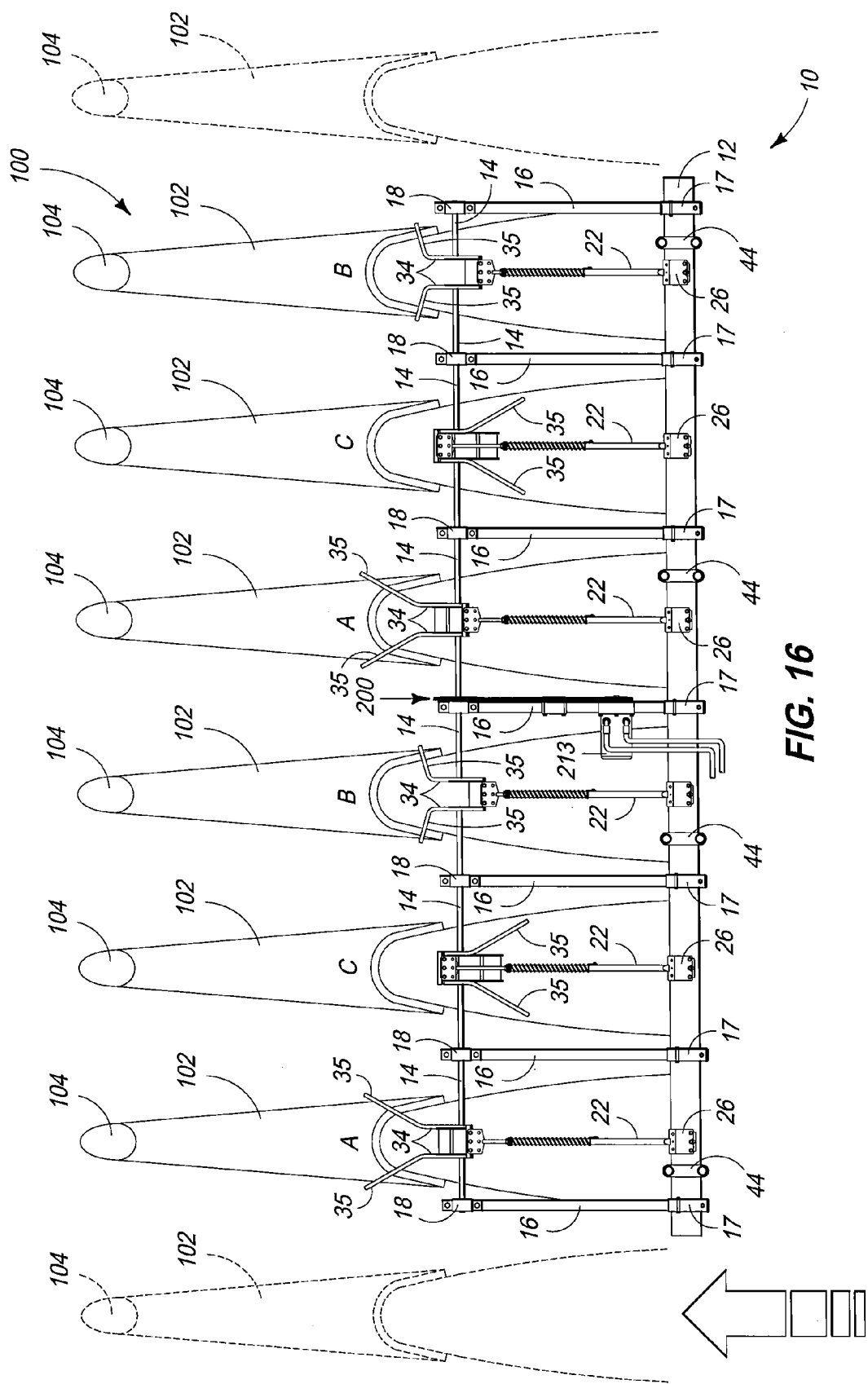
FIG. 16 is a subsequent view of the corn rake illustrated in FIG. 15 with the tines being rotated with respect to FIG. 15.
Figure 17:
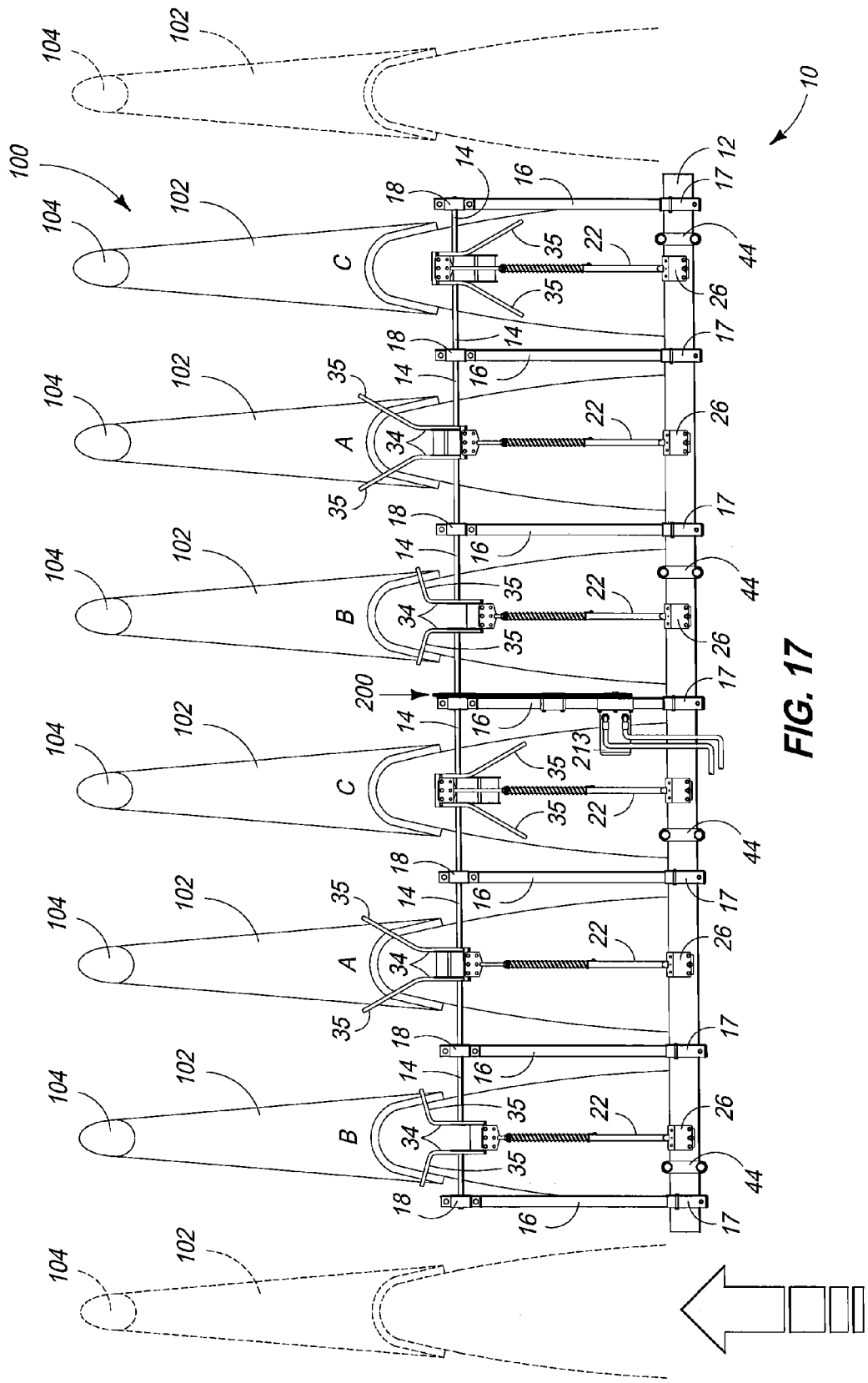
FIG. 17 is a subsequent view of the corn rake illustrated in FIG. 16 with the tines being rotated with respect to FIG. 16.

Referring next to FIGS. 15-17, such diagrammatically illustrates the positioning of various pairs of tines relative to other pairs over time as the camshaft makes one rotation. In the depiction, the timing has been set such that every third pair of tines is timed identically. Note that this is but one example timing configuration. There are seven timing positions (based upon the seven timing holes 43 as shown in FIG. 4. Accordingly, for a rake having six cams, each cam can be timed to a different position relative to all other cams. Any combination of positioning is contemplated.

The sequential FIGS. 15-17 show the rotation of the pairs of tines from A to B to C. Upon completion of the rotation of the camshaft, those tines originally in position A would again be in position A.

Also depicted in FIGS. 15-17 is the number of pairs of tines relative to the number of snouts on the header. As depicted, there is one pair of tines per snout, with a total of six of each. Such would be appropriate for a six-row header that harvests six rows at a time. The number of pairs of tines can preferably increase as the size of the header and number of snouts increases. It is further noted that hydraulic pump 213 is disposed centrally with three pairs of tine on each side. This positioning is optional and the hydraulic pump can be positioned anywhere along the length of the rake implement.

Also, four clamps 44 are shown mounting the implement to the header. It is to be understood that the number and positioning of such clamps is an example and alternative configurations are contemplated.

Methodology of the invention includes harvesting corn utilizing the above described rake implement attached to a corn header. The harvester is driven through the corn, some or all of which may be downed corn, while the camshaft of the rake is rotating. Rotation of the camshaft causes repositioning of the rake tines as described above. Such rotation pulls the downed cord into the header and directs the corn toward the auger section of the header. The rake of the invention is capable of picking up unidirectional downed corn and multi-directional downed corn including crisscrossed corn stalks.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A rake for harvesting downed corn, comprising:
   a mounting plate;
   a camshaft comprising a series of cams;
   a plurality of support bars extending between the mounting plate and the camshaft; and
   a pair of rake tines attached to each of the cams, each pair of rake tines comprising an upper portion having segments of the tines parallel to each other and a lower portion having segments of the tines angled laterally outward relative to each other.

2. The rake of claim 1 wherein a chain sprocket is mounted on the camshaft and wherein the camshaft is turned by a chain.

3. The rake of claim 2 wherein a chain drive is mounted on a support bar and further comprising a hydraulic motor, wherein the hydraulic motor turns the chain drive.

4. The rake of claim 1 wherein the support bars are adjustable in length.

5. The rake of claim 1 wherein the support bars comprise bearings through which the camshaft passes.

6. The rake of claim 1 wherein a pair of rake tines is attached to each cam, the pair of rake tines being connected by a crossbar at a top end, and further comprising:
- a plurality of spaced supports on an upper surface of the mounting plate; and
- individual kickback arms attached at a first end to each of the posts and attached at a second end to the crossbar of the pair of tines.

7. The rake of claim 6 wherein an attachment of the kickback arms to the spaced posts is flexible allowing the arms to raise and lower as the camshaft turns.

8. The rake of claim 6 wherein the arms are fitted with a pressure spring.

9. The rake of claim 6 wherein the arms are adjustable in length.

* * * * *

UNITED STATES PATENT AND TRADEMARK OFFICE
CERTIFICATE OF CORRECTION

PATENT NO. : 8,590,283 B2
APPLICATION NO. : 13/355001
DATED : November 26, 2013
INVENTOR(S) : LeRoy Koehn and Eugene Unruh Page 1 of 1

It is certified that error appears in the above-identified patent and that said Letters Patent is hereby corrected as shown below:

In the Specification

Column 1, line 55 – Replace "cord rake" with --corn rake--

Column 1, line 59 – Replace "rack tines" with --rake tines--

Column 2, line 20 – Replace "example rack" with --example rake--

Column 2, line 38 – Replace "cord without" with --corn without--

Column 2, line 53 – Replace "cord header" with --corn header--

Column 3, line 44 – Replace "dashed lined" with --dashed lines--

Column 3, line 46 – Replace "preferably made" with --preferably be made--

Column 6, line 27 – Replace "pairs of tine" with --pairs of tines--

Column 6, line 40 – Replace "downed cord" with --downed corn--

Signed and Sealed this
Twenty-second Day of September, 2015

Michelle K. Lee
*Director of the United States Patent and Trademark Office*